United States Patent [19]
Garnier et al.

[11] 4,130,136
[45] Dec. 19, 1978

[54] MIXING TAP

[75] Inventors: Régis Garnier; Claude Delpla, both of Reims, France

[73] Assignee: Societe Generale de Fonderie, Paris, France

[21] Appl. No.: 779,143

[22] Filed: Mar. 18, 1977

[30] Foreign Application Priority Data
May 4, 1976 [FR] France .................... 76 13257

[51] Int. Cl.² ................................ F16K 11/06
[52] U.S. Cl. ........................ 137/625.41; 137/368; 137/375; 251/368
[58] Field of Search ............ 251/368; 137/625.41, 137/375

[56] References Cited
U.S. PATENT DOCUMENTS
3,536,092  10/1970  Klasson ................ 251/368 X
3,955,598  5/1976  Knapp ................ 137/625.41

FOREIGN PATENT DOCUMENTS
2105339  4/1972  France ................ 137/625.41

*Primary Examiner*—Arnold Rosenthal
*Attorney, Agent, or Firm*—Young & Thompson

[57] ABSTRACT

A movable obturator provided with two flow orifices is placed between an abutment member and two nozzles for the admission of hot water and cold water. The obturator is capable of sliding over the nozzles and provided with a plastic shoe covered by a metallic shell on which the nozzles are applied in leak-tight manner. That face of the shell on which the nozzles are applied is covered with a coating of self-lubricating polymer.

11 Claims, 8 Drawing Figures

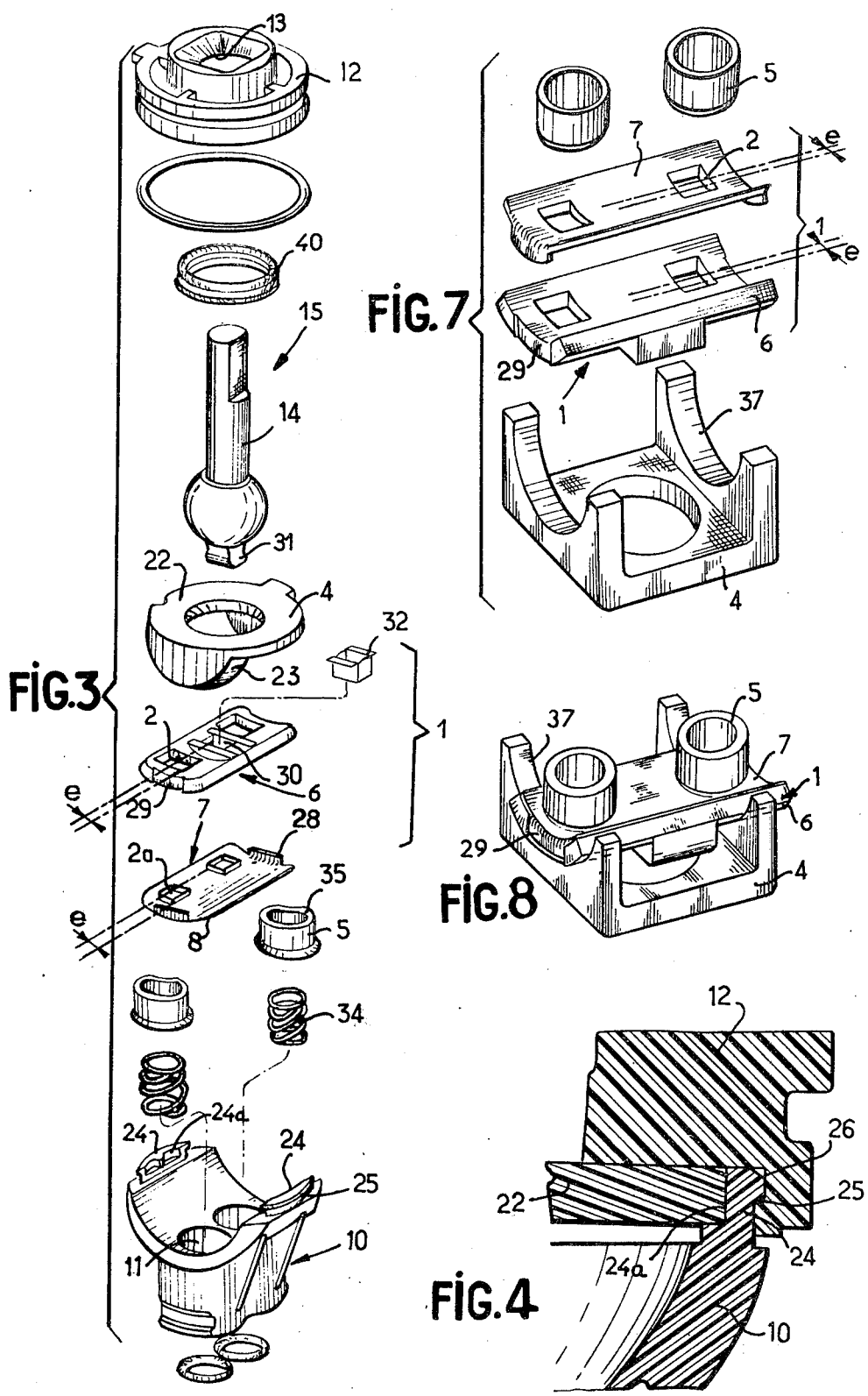

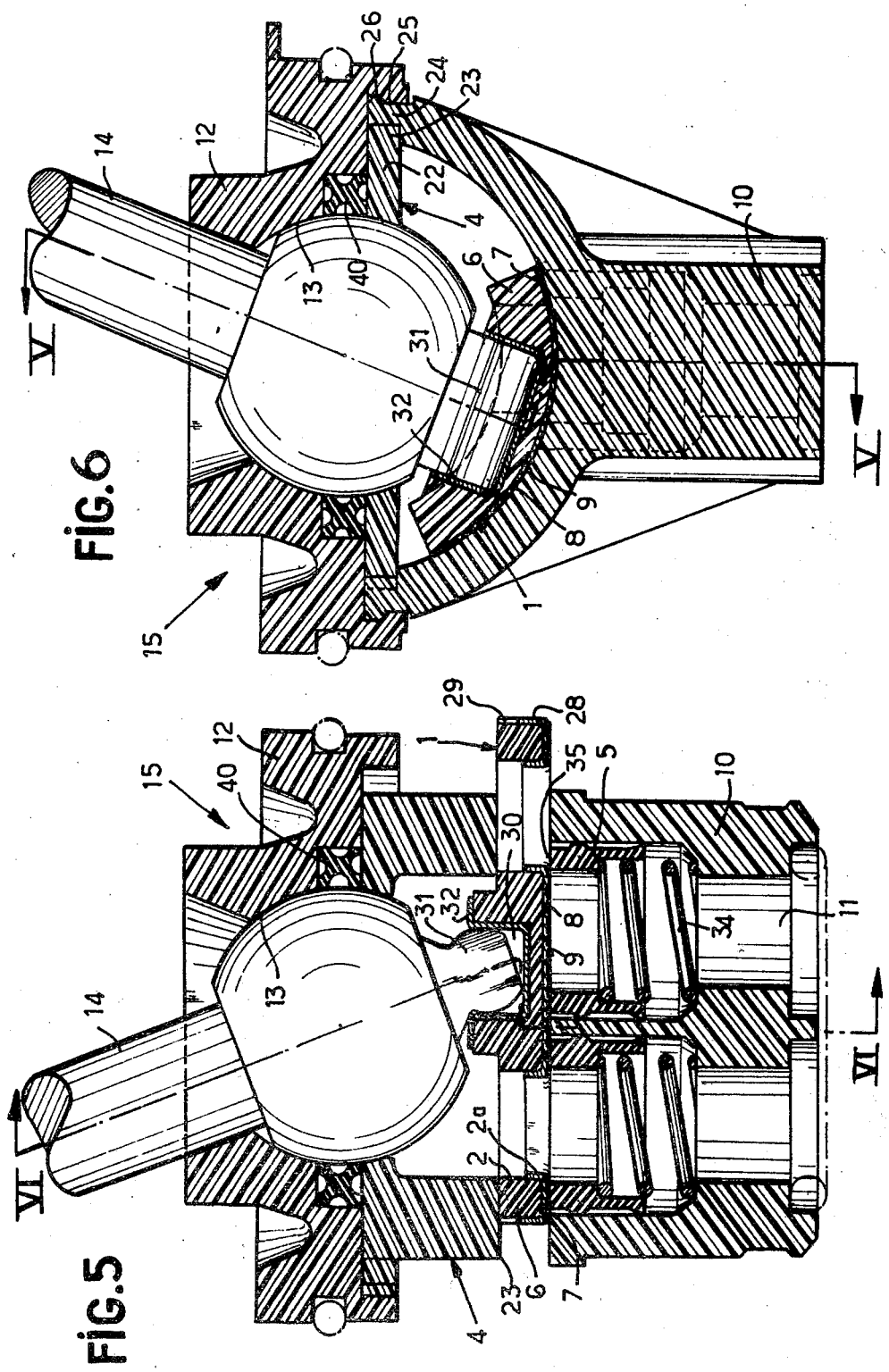

MIXING TAP

The present invention relates to a mixing tap or faucet which makes it possible to adjust the relative flow rate of two liquids.

A mixing tap of this type usually has a movable obturator provided with two flow orifices and slidably mounted between a stationary abutment member and two nozzles for the admission of hot and cold water over which the obturator is capable of sliding in leak-tight manner. The nozzles are applied against the movable obturator by elastic means such as springs with a view to achieving the necessary degree of leak-tightness.

By displacing the obturator, the user sets the relative positions of the orifices and the nozzles in order to adjust to the desired value the respective cross-sectional areas provided for the flow of hot water and cold water.

In a first known design which was disclosed in French Pat. No. 2,105,339 granted to the present Applicant, the abutment member and the obturator are formed of plastic material which has a sufficient degree of hardness and strength to be capable of withstanding the pressure of the water whilst the packing elements — referred-to in this instance as nozzles — are applied against the obturator by means of springs and formed especially of elastomer. In this form of construction the obtruator can be displaced in two perpendicular directions. The combination of the orifices of the obturator with those of the packing elements makes it possible on the one hand to control the rate of flow and on the other hand to regulate the proportions employed in the mixture.

Although this design offers an advantage from the point of view of inherent simplicity and convenience of control by means of a single operating handle which provides two degrees of freedom, experience has shown that a number of imperfections appear under utilization conditions.

In particular, when a tap has been out of use for a long period of time, the elastomer of the nozzle tends to stick to the plastic material of the obturator, this being due in all probability to the fact that the vulcanization products which they contain cause surface degradation of polymers as is the case with conventional metals.

Furthermore, the pressure exerted by the nozzles on the obturator results in particularly strong friction since the tangent of the angle of friction attains a high value of the order of 0.27. As a result of this friction, the mixing tap is stiff, imprecise and inconvenient while also giving rise to objectionable jarring and grating sounds.

In order to overcome these defects, it is common practice to lubricate contacting parts at the time of assembly with special greases, for example of the silicone type. The light film which is interposed between the parts has the effect of temporarily reducing coefficients of friction and partially suppressing "sticking" phenomena but operation with hot water and repeated operations of the mechanism rapidly eliminate this effect and the same defects appear once again.

In another design, the obturator which is constructed of metal has a spherical shape, the nozzles being integrated in a bearing unit of elastic material so as to form a cup on which is bonded a layer of PTFE whilst the abutment member is of annular design, formed of metal and coated with PTFE.

A device of this type is difficult to construct since the layer of PTFE cannot readily be formed prior to bonding and the spherical shape obtained is imperfect, with the result that the obturator is not uniformly applied against the bearing unit.

Furthermore, the need for leak-tightness of the PTFE-metal junction in turn makes it necessary to ensure that the state of surface of the obturator is of high quality, thus increasing the cost of the device to an appreciable extent. Even so, the requisite standard of leak-tightness calls for high compression of the bearing unit. This causes both an increase in friction and creep deformation of the PTFE during periods of rest towards the interior of the orifices under the pressure exerted by the elastic material.

The present Applicant has also endeavored without success to make use of the first design mentioned in the foregoing and, without changing the structure of this latter, to find a means of obtaining a mixing tap which offers silent and smooth operation, is leak-tight and durable as well as simple and economical. To this end, the tests described below were accordingly carried out.

An attempt was first made to form an antifriction coating, especially of PTFE, either on the obturator or on the nozzles. Coating of this type, however, can only be formed in the cold state since the supporting means just mentioned are not capable of withstanding the curing temperature of PTFE. Whatever application technique is adopted such as varnish or aerosol, it has therefore proved impossible to obtain a durable reduction of friction. The improvement achieved in fact remains almost as short-lived as in the case of lubrication with silicone grease mentioned earlier since the resistance of coatings formed in this manner is inadequate.

A second test then consisted in forming an obturator of solid PTFE. However, the inadequate mechanical strength of this material and especially its tendency to exhibit creep resulted in deformations which proved detrimental to good operation under the combined action of water pressure and the force of application of the nozzles.

Further possibilities could also be contemplated but have had to be discarded for the following reasons:

The practical application of an entirely metallic obturator, especially of stainless steel and coated with PTFE which is sintered at high temperature, would have entailed the need for difficult machining operations by reason of the complexity of the shapes to be formed and would also have increased the cost price of the end product to a prohibitive extent.

The use of an obturator of plastic material having a low degree of hardness such as a polyamide would not have made it possible to obtain the requisite mechanical strength while still leaving completely unresolved the problem of jamming of the obturator as a result of adhesion of the nozzles after periods of non-use.

However, the present Applicant has finally succeeded in achieving the desired result by means of a specific modification made in the structure of the obturator while also employing a complex combination of materials.

The mixing tap in accordance with the invention comprises a movable obturator provided with two flow orifices and placed between an abutment member and two nozzles for the admission of hot water and cold water over which the obturator is capable of sliding. Said mixing tap is distinguished by the fact that the obturator is provided with a plastic shoe covered by a metallic shell on which the nozzles are applied in leak-tight manner, that face of said shell on which the nozzles are applied being covered with a coating of self-lubricating polymer.

The obturator is thus endowed both with the necessary mechanical strength and rigidity to afford resistance to the water pressure and with the sliding characteristics which ensure smooth and silent operation without any damage to the packing elements. At the same time, the coating of PTFE can be bonded to the shell in a durable manner.

In a preferred embodiment, the shell is of die-stamped stainless steel coated with a thin layer of PTFE and the nozzles are formed of elastomer material such as a nitrile complex whilst the abutment member is of polymer material of high strength and hardness such as an acetal resin and the shoe is formed of polymer material of low hardness having good sliding characteristics such as a polyamide.

The complex combination as thus defined makes it possible to derive cumulative benefits from all the advantages permitted by the structural modification mentioned above and to obtain a mixing tap which has all the requisite properties, the obturator being made compatible both with the nozzles and with the abutment member from a friction standpoint.

Further distinctive features and advantages of the invention will become apparent from the following description, two embodiments of the mixing tap in accordance with the invention being illustrated in the accompanying drawings which are given by way of example and not in any limiting sense, and in which:

FIG. 3 is an exploded view in perspective showing the mixing tap of FIGS. 1 and 2 without the tap body;

FIG. 4 is a view to a very large scale of the portion designated by the reference IV in FIG. 2 and showing the assembly of the abutment member of the mixing tap of FIGS. 1 to 3;

FIGS. 5 and 6 are enlarged views of the same mixing tap on transverse planes of section corresponding respectively to FIGS. 1 and 2, the tap body having been omitted from these figures and the actuating lever being located in a different position;

FIG. 7 is an exploded view in perspective showing the obturator and nozzles of a second embodiment of the invention;

FIG. 8 is a perspective view showing the relative positions of the components of FIG. 7 when these latter are assembled in service.

Figure 1:
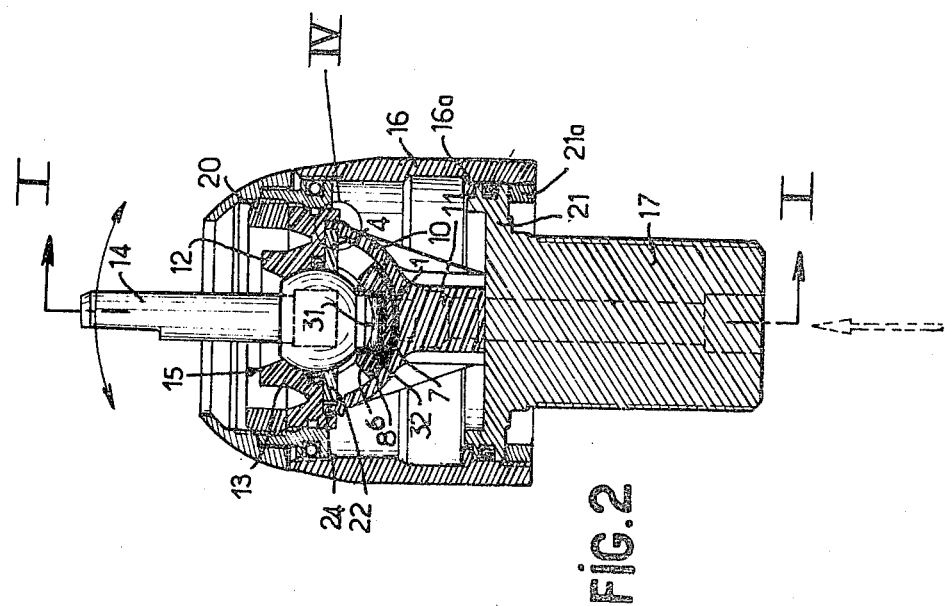
FIG. 1 is a sectional view taken along line I—I of FIG. 2, there being shown in this figure a first embodiment of the invention and passageways for the admission and delivery of water.
Figure 2:
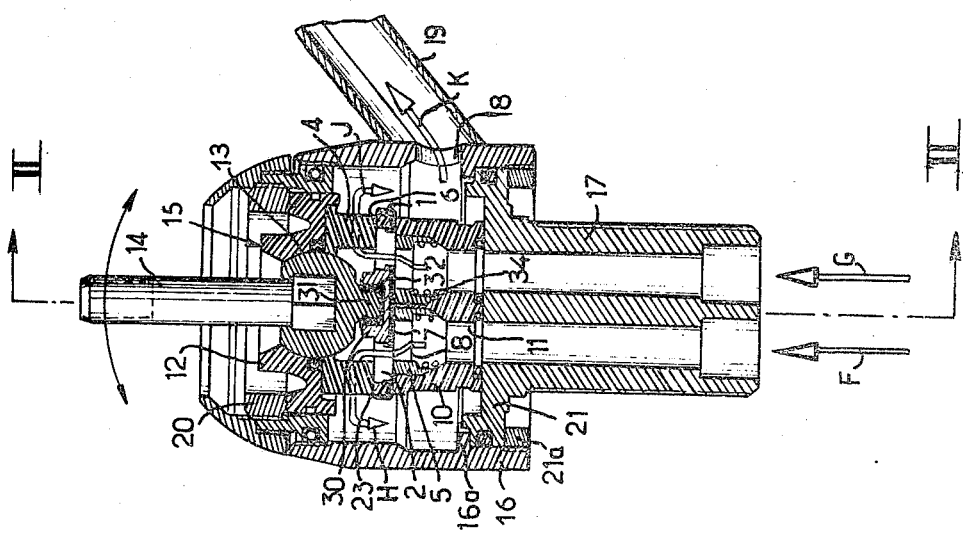
FIG. 2 is a sectional view taken along line II—II of FIG. 1 and showing the same embodiment under the same conditions.

The mixing tap or faucet of FIGS. 1 to 3 comprises a movable obturator 1 having the shape of a portion of cylinder and provided with two square flow orifices 2 for the hot water and the cold water. Said obturator is intended to slide between an abutment member 4 of hard material and two nozzles 5 of elastic material for admitting hot water and cold water.

The obturator 1 comprises a shoe 6 covered by a separately fitted metallic shell 7 on which the nozzles 5 are applied in leak-tight manner. The face 8 of said shell on which said nozzles are applied is covered with a coating 9 of self-lubricating polymer (as shown in FIG. 6).

The obturator 1, the abutment member 4 and the nozzles 5 are clamped in position between a semi-cylindrical cup 10 provided with two parallel radial passageways 11 in which the nozzles 5 are housed with slight friction so as to ensure leak-tightness, a cover element 12 being removably attached to the cup 10 and fitted with a bearing seat 13 for a toggle-lever 14 with knuckle ball. The assembly thus obtained forms a cartridge 15 as shown in the exploded view of FIG. 3 and in cross-section in FIGS. 5 and 6.

Under service conditions, the cartridge 15 is placed within a tap body 16 comprising a double-ported admission tube 17 connected to the passageways 11 and to the nozzles 5 and a discharge port 18 which communicates with a spout 19 in the version shown in the figure. The cartridge is maintained in position by a ring 20 which is screwed in an internally-threaded portion of the body 16 so as to apply said cartridge against an annular flange 21 which is integral with the double-ported admission tube 17, said tube being in turn clamped between an annular shoulder 16a of the body 16 and a removable threaded ring 21a.

The abutment member 4 has two semi-cylindrical bearing surfaces 23 disposed in the line of extension of each other and placed astride the nozzles 5 in oppositely-facing relation to the cup 10. The bearing surfaces 23 are joined together by means of a circular plate 22 placed in a diametral plane of the cup 10 transversely to the direction of the nozzles 5.

As shown in FIG. 4 in the case of one of the points concerned, the plate 22 is clamped at two diametrically opposite points between the internal faces 24a of two lugs 24 which form extensions of the sides of the cup 10 and are each provided with an external projecting lip 25 engaged in a corresponding groove 26 of the cover element 12.

The obturator 1 essentially has the shape of a portion of cylinder, the convex face of which is formed by the shoe 6 and fits in the cup 10 whilst the concave face formed by the shell 7 fits on the bearing surfaces 23. Said obturator is capable of sliding with two degrees of freedom between the cup 10 and the bearing surfaces 23 in order to displace its orifices 2 with respect to the nozzles 5.

The shell 7 is fixed on the shoe 6 by means of two spring-acting lateral tongues 28 which are forcibly engaged in end-recesses 29 of the shoe 6, said shoe being accordingly clamped between said tongues.

The shell 7 is provided opposite to the orifices 2 of the shoe 6 with corresponding orifices 2a also of square cross-section and provided with bent-back edges in the embodiment shown in the figures.

In the central portion of the concavity of the shoe 6, there is formed a recess 30 for accommodating an actuating lug 31 of the lever 14, the internal faces of which are covered by the sides of a protective metallic insert 32 formed for example of folded stainless steel sheet.

The convex surface 8 of the shell 7 is covered with an antifriction coating 9 which is preferably of very small thickness as shown in FIGS. 5 and 6 and against which each nozzle 5 is applied by a spring 34 housed within the corresponding passageway 11.

In order to ensure leak-tightness of this contact, each nozzle 5 is provided with an edge 35 which is cut along the cylindrical surface 8 in order to conform exactly to the shape of this latter.

The abutment member 4 is preferably of polymer material of high strength and hardness such as an acetal resin of the type known by the trade name Hostaform whilst the shoe 6 is formed of another polymer material having a lower degree of hardness such as a polyamide of the Nylon or Rilsan type having good characteristics of sliding with respect to the acetal resin.

Furthermore, the knuckle ball of the toggle-lever 14 can receive an antifriction coating of PTFE, for example, and is engaged under service conditions in a seal 40 having a hollow internal profile and inserted in the cover element 12.

In addition, the shell 7 is advantageously formed of die-stamped stainless steel, in which case the antifriction coating 9 is constituted by PTFE which is sintered at high temperature and especially at 350° C. whilst the nozzles 5 are of elastomer such as a nitrile complex or of plastic material having the desired elasticity for ensuring the requisite standard of leak-tightness.

A very thin coating of PTFE having a thickness of the order of 35 microns is preferably employed.

The antifriction coating 9 can be formed by application of the copolymer in the form of powder, for example by electrostatic spray-coating, electrophoresis, dipping or deposition with a roller, the shell 7 being then heated to the sintering temperature during the time which is necessary before being mounted on the shoe 6.

Prior to the application process mentioned above, the surface 8 may previously have been made porous or roughened by chemical or mechanical attack (sand-blasting, shot-blasting or the like).

During use, the hot and cold water streams are each admitted through one of the ports of the double tube 17 in the direction of the arrows F and G, pass through the nozzles 5 and the corresponding orifices 2 (in the direction of the arrows H and J), are mixed within the body 16 by passing through the discharge port 18 in the direction of the arrow K.

By actuating the toggle-lever 14, the user can displace the obturator 1 in either of its two degrees of freedom and uncover both nozzles 5 to a greater or lesser extent, thereby readily enabling him to adjust the outflow rate and the relative proportions of the two streams of water in the mixture.

By virtue of the antifriction coating 9, and in particular when this latter is of PTFE, sliding motion of the obturator 1 over the nozzles 5 at the time of control operations takes place with very slight friction. In addition, residual resistance to friction is negligible in the stationary position. This advantageous result is obtained even if the pressure of the springs 34 which apply the nozzles 5 against the shell 7 is of a high order and leak-tightness can therefore be ensured without any difficulty.

The coating 9 has high chemical inertia and an anti-adhesive character which eliminate any scale deposit and any adhesion of the nozzles to the surface 8. The quality of friction obtained is therefore durable and the mixing tap in accordance with the invention has a long service life.

Moreover, the invention makes it possible to add to these first results further unexpected and advantageous consequences which provide a complete solution to the problems created by mixing taps of known types. Thus in the first place, the shell 7 has excellent rigidity and prevents any deformation of the obturator 1 in spite of the plasticity of the shoe 6 by endowing it with sufficient mechanical strength to withstand the pressure of water and of the springs 34.

The choice of plastic material to be employed for the formation of the shoe 6 is therefore extended to a considerably broader range and a polymer having a low value of hardness of the type described in the foregoing can be employed without any difficulty. This accordingly ensures good sliding action of the obturator 1 on the bearing surface 23, particularly as the hardness of the material constituting said surface is of much higher value than that of the shoe 6.

All objectionable friction is thus eliminated as well as all wear by abrasion, especially as the knuckle of the toggle-lever 14 is in turn covered with an antifriction coating which prevents sticking of the ball on the seal 40. The stresses to which said knuckle ball is subjected are of a relatively low order and the antifriction coating has a sufficiently long useful life even when applied in the cold state.

For the reasons given above, the abutment member 4 can be very rigid, thus enabling it to withstand working stresses and to ensure in addition that the two lugs 24 of the cup 10 are locked in position, thus preventing any flexural deformation of this latter as a result of the clamping action exerted thereon by the cover element 12.

It is therefore observed that problems of mechanical strength and length of life of the different components are also solved by virtue of the combination of the shell 7 and of the shoe 6.

The assembly which has just been described is also particularly economical to construct. It is in fact of simple structural design and makes use of only inexpensive materials which are either molded without machining or die-stamped, the most costly constituents such as PTFE and stainless steel being employed only in small quantities.

The invention is not limited to the embodiment which has just been described and many alternative forms can be contemplated. In particular, as shown in FIGS. 7 and 8, the concave portion of the obturator 1 could be in contact with the nozzles 5 by means of the shell 7. The abutment member 4 would in that case have semi-cylindrical cradles 37 instead of bearing surfaces 23.

The sliding surface of the shell 7 could be either spherical or flat whilst the possibility of displacement of these latter retain the two degrees of freedom described in the foregoing.

Finally, the obturator 1 could be displaceable only in one degree of freedom, for example in order to carry out only the proportioning of a blend of hot water and cold water, and the cross-section of the orifices 2 need not be of square shape.

The actuating lug 31 could be detachably fitted in the toggle-lever 14; this would make it possible to simplify the design of the lever if this latter is formed of metal whilst the lug 31 proper can be of polymer having a high degree of hardness such as an acetal resin.

The assembly which is formed by the lug 31, the recess 30 and the insert 32 could be arranged in a different manner so that the male portion could be rigidly fixed to the shoe 6 whilst the female portion is located on the toggle-lever 14.

The recess 31 could extend right through the shoe 6 whilst the insert 32 is directly fixed on the shell 7.

The shell 7 can be formed of brass or of any other metal on condition that this latter is provided with a protective coating if the metal employed is not corrosion-resistant.

We claim:

1. A mixing tap comprising a movable obturator provided with two flow orifices and placed between an abutment member and two nozzles for the admission of hot water and cold water over which the obturator is capable of sliding, wherein the obturator is provided with a plastic shoe covered by a metallic shell on which the nozzles are applied in leak-tight manner, that face of said shell on which the nozzles are applied being covered with a coating of self-lubricating polymer.

2. A tap according to claim 1, wherein the shell is of die-stamped metal.

3. A tap according to claim 1, wherein the self-lubricating coating is a thin layer of PTFE.

4. A tap according to claim 1, wherein the nozzles are of elastomer such as a nitrile complex.

5. A tap according to claim 1, wherein the abutment member is of polymer material having high strength and hardness, the obturator being of polymer material having a lower degree of hardness.

6. A tap according to claim 5, wherein the abutment member is of acetal resin and the obturator is of polyamide.

7. A tap according to claim 1, wherein the obturator has a recess for accommodating an actuating lug, the lateral faces of said recess being covered by a metallic insert.

8. A tap according to claim 1, and comprising a semi-cylindrical cup which is closed by the abutment member and in which the nozzles are disposed radially, the obturator being constituted by a portion of cylinder which can be displaced in oppositely-facing relation to the cup, wherein the shell is provided with a thin metallic sheet for covering that face of the shoe which is placed opposite to said cup.

9. A tap according to claim 8, wherein the shell is provided with two spring-acting tongues for gripping the two opposite ends of the shoe.

10. A tap according to claim 9, wherein the abutment member is placed between two lugs forming extensions of the sides of the cup, a cover element being snap-fastened onto the two lugs so as to maintain the abutment member in position.

11. A tap according to claim 1 and comprising an obturator constituted by a portion of cylinder, wherein the abutment member has two cylindrical bearing cradles for the ends of the obturator on the side opposite to the nozzles and wherein the shell is provided with a thin cylindrical metallic sheet for covering that face of the obturator which is placed opposite to the nozzles, said sheet being held in position by means of two lateral tongues.

* * * * *